United States Patent [19]

Ketonen

[11] Patent Number: 5,163,489
[45] Date of Patent: Nov. 17, 1992

[54] TIMBER HARVESTER

[76] Inventor: Lauri K. Ketonen, Huvilakatu 15, SF-64120 Kristiinankaupunki, Finland

[21] Appl. No.: 800,153
[22] Filed: Nov. 27, 1991
[51] Int. Cl.⁵ .............................................. A01G 23/08
[52] U.S. Cl. .................................. 144/3 D; 144/2 Z; 144/34 R; 144/246 R; 144/246 F; 144/336; 144/338
[58] Field of Search ...................... 144/2 Z, 3 D, 34 R, 144/34 E, 246 R, 246 E, 246 F, 335, 336, 338, 343

[56] References Cited

U.S. PATENT DOCUMENTS

| 3,797,541 | 3/1974 | Kurelek et al. | 144/338 |
| 4,194,542 | 3/1980 | Eriksson | 144/2 Z |
| 4,239,067 | 12/1980 | Mononen | 144/2 Z |
| 4,515,192 | 5/1985 | Eriksson | 144/2 Z |
| 4,800,936 | 1/1989 | Pomies et al. | 144/34 R |
| 4,881,582 | 11/1989 | Ketonen | 144/2 Z |

FOREIGN PATENT DOCUMENTS 1066593 11/1979 Canada ............................ 144/2 Z Primary Examiner—W. Donald Bray
Attorney, Agent, or Firm—Brooks & Kushman

[57] ABSTRACT

A timber harvester disclosed includes a frame (1), two feed tracks (5) jointed opposite one another, a front stripping blade (20), and a rear stripping blade (16). A frame (4) of the feed track (5) is carried on jointed trapezoid arms (2,3). A rear stripping blade (16) is located on the frame (4) of one of the feed tracks (5) and is jointed essentially on the line of the compressive force between the feed track (5) and a tree (7), when seen from the direction of the timber feed.

3 Claims, 3 Drawing Sheets

TIMBER HARVESTER

TECHNICAL FIELD

The present invention relates to a timber harvester including a frame, two feed tracks/rollers that are jointed opposite one another, a front stripping blade and a rear stripping blade, in which the frame of the tracks/rollers is carried on jointed trapezoid arms.

BACKGROUND ART

The stripping blades proper that form part of the front part of a timber harvester are not able to strip branches over the length of a harvester's own frame. The frame structure of the machine and the feeding devices strip part of the branches that remain in this length. However, when using a timber harvester it is usually attempted to grip the tree in the felling stage from the side with least branches. Thus, there are often branches to be stripped on the opposite side. A rear stripping blade for this purpose is often installed on timber harvesters.

A timber harvester, in which rear blades are used, in accordance with the type referred to is known under type reference Kockums Industri GSA 62. Two rear blades are jointed directly to the frame, between the feed rollers and the saw. In this device, the rear stripping blades are exactly the same as the front stripping blades. Rear stripping blades are exactly the same as the front stripping blades. Rear stripping blades constructed in this way work well, but the length of the machine increases greatly as a result.

SUMMARY OF THE INVENTION

An object of the present invention is to create an improved timber harvester, in which a rear stripping blade can be installed in a smaller space than previously.

In carrying out the above object, the timber harvester consists of a frame, feed tracks/rollers jointed opposite one another, a front stripping blade, and a rear stripping blade. The frame of the feed tracks/rollers is carried on joined trapezoid arms and the rear stripping blade is attached to the frame of one of the feed tracks/rollers, essentially in the line of the line of the compressive force between the feed track/roller and the tree, when seen from the direction of the tree feed. The rear blade and its operating cylinder are located in the widened case of the saw.

By locating the rear stripping blade in the frame of the second feed device, generally only one stripping blade is required, and in addition, it can be shorter than previously. Furthermore, the stripping blade point can be quite straight, in which case it is easy to locate it in a widened saw case, when the saw is also located in the feed device frame.

In what follows, the invention is described with reference to the accompanying illustrations, which show a timber harvester equipped with a rear stripping blade in accordance with the invention.

BEST MODE FOR CARRYING OUT THE INVENTION

With reference to the drawings, a timber harvester constructed in accordance with the present invention is used to strip branches from felled trees. As is hereinafter more fully described, the harvester includes an improved rear stripping blade assembly.

Figure 1:
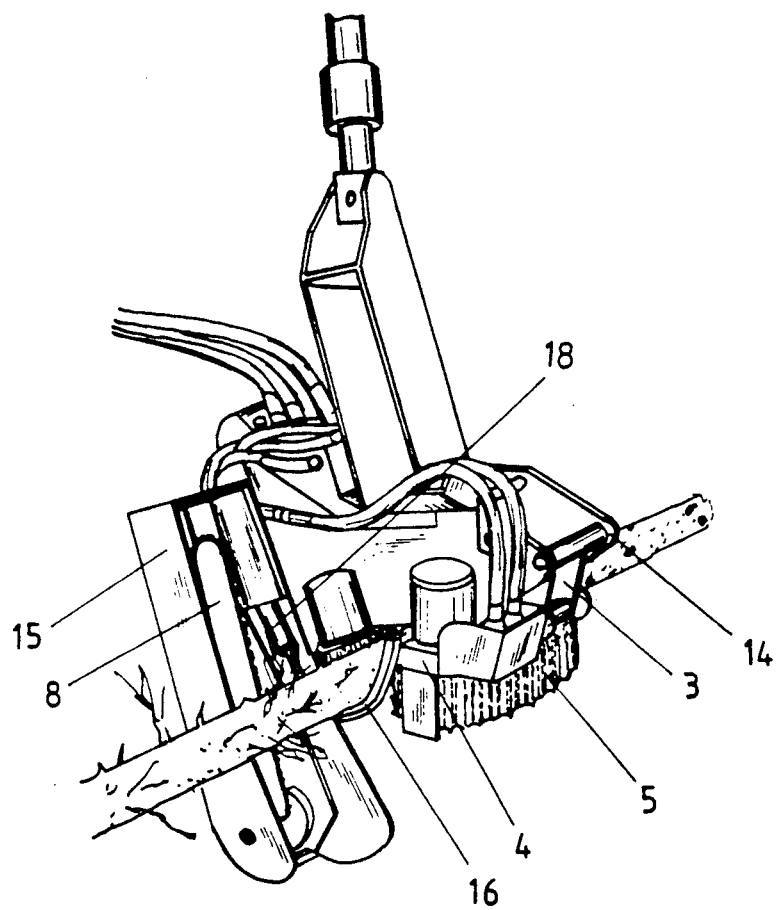
FIG. 1 is a perspective view of a timber harvester constructed in accordance with the present invention seen from the saw side.

In FIG. 1, the timber harvester is shown from the saw side with the rear stripping blade in the operating position. This figure shows the handling of a tree, which is being stripped, not only by the front stripping blades, but also by the frame 1 of the machine and the feed tracks 5 and rear stripping blade 16.

In FIGS. 2-5, the harvester is shown schematically, and in these too the frame is marked with the reference number 1. Feed tracks 5, which may also alternatively be rollers, are suspended from frame 1. The feed tracks 5 are driven by a hydraulic motor. The feed tracks are located on both sides of the tree and their frame structure 4 is jointed by means of trapezoid arms 2 and 3.

The jointing point of arm 2 on frame 1 is marked by reference number 13 and the joint point of feed track frame 4 and arm 2 is marked by the reference number 10. A saw case 15 is attached to frame construction 4 of the feed track 5, and stripping blade 16 is further attached to it at joint point 17. Cylinder 18 moves the rear stripping blade 16, and in FIG. 1 blade 16 is shown in the stripping position as a solid line, and in the rest position as a broken line.

Figure 2:
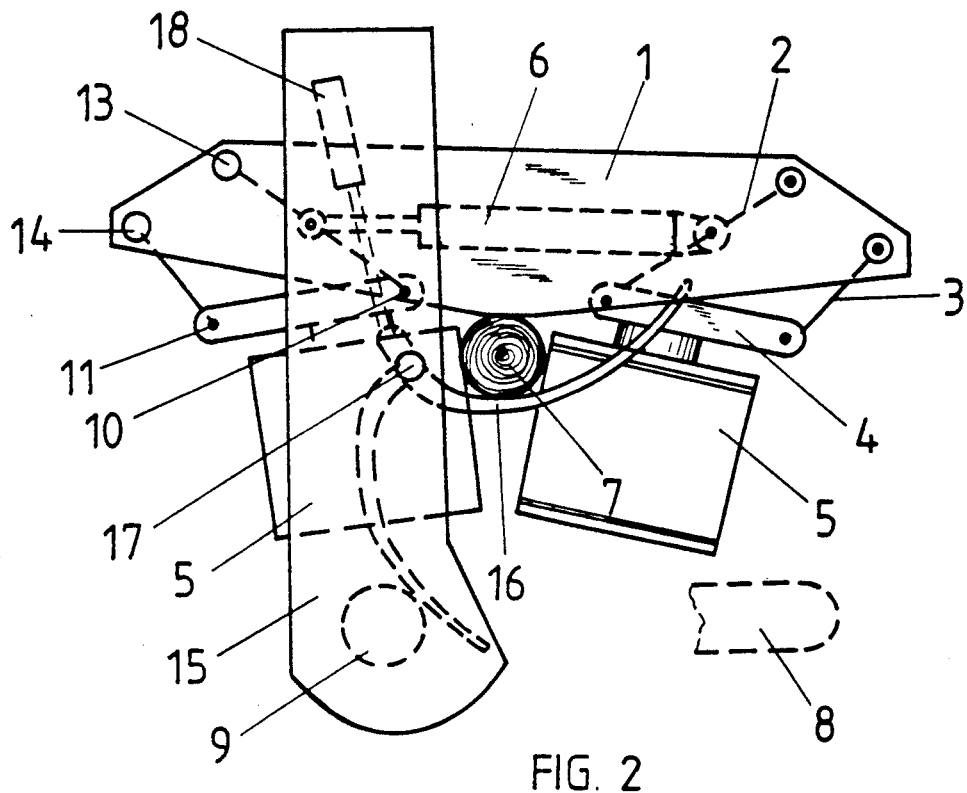
FIG. 2 illustrates a rear stripping blade of the harvester handling a small tree.
Figure 3:
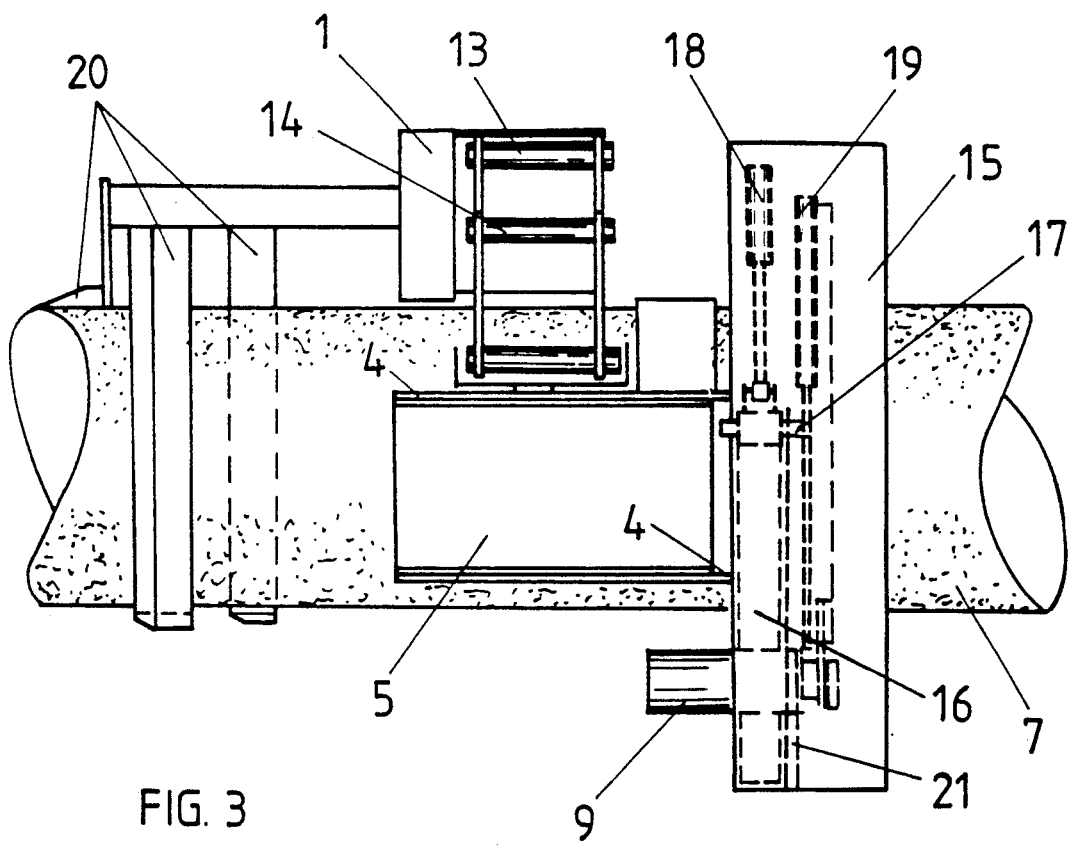
FIG. 3 is a side view of the timber harvester.

Hydraulic cylinder 6 holds the feed tracks 5 against the tree 7 being handled. The motor 9 of the saw 8 is located in the lower part of the case 15. FIG. 2 also shows the flange of saw 8 in the lower position, that is, after cutting, before it begins its return movement inside case 15.

In FIG. 2, the stripping blades 20 proper are shown from the side, these being usually three in number arranged to interlock. The rear stripping blade 16 also appears in FIG. 2 as a broken line inside the case 15 of the saw. The longitudinal area of the tree 7 between the blades 20 and the rear blade 16 is thus stripped by means of the frame 1 of the machine, the feed tracks 5, and the rear blade 16. The hydraulic cylinder 19 drives the cutting saw 8. The motor 9 of the cutting saw is partly outside of the case 15.

Figure 4:
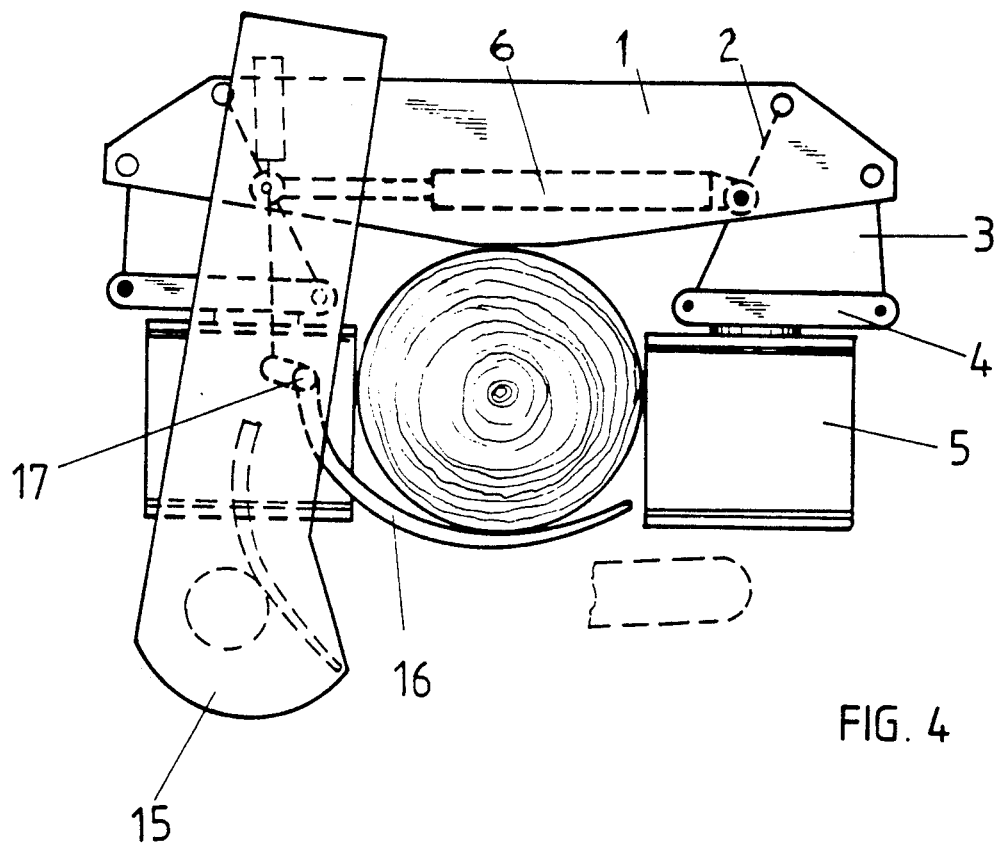
FIG. 4 illustrates the timber harvester in the manner of FIG. 1 handling a medium-sized tree.

In FIG. 4, the stripping blade 16 is shown in the stripping position, beneath the large tree 7. The form and length of the blade 16 play a large part in determining how well the stripping takes place. But the branches in large trees no longer need stripping right to the surface of the tree 7.

Figure 5:
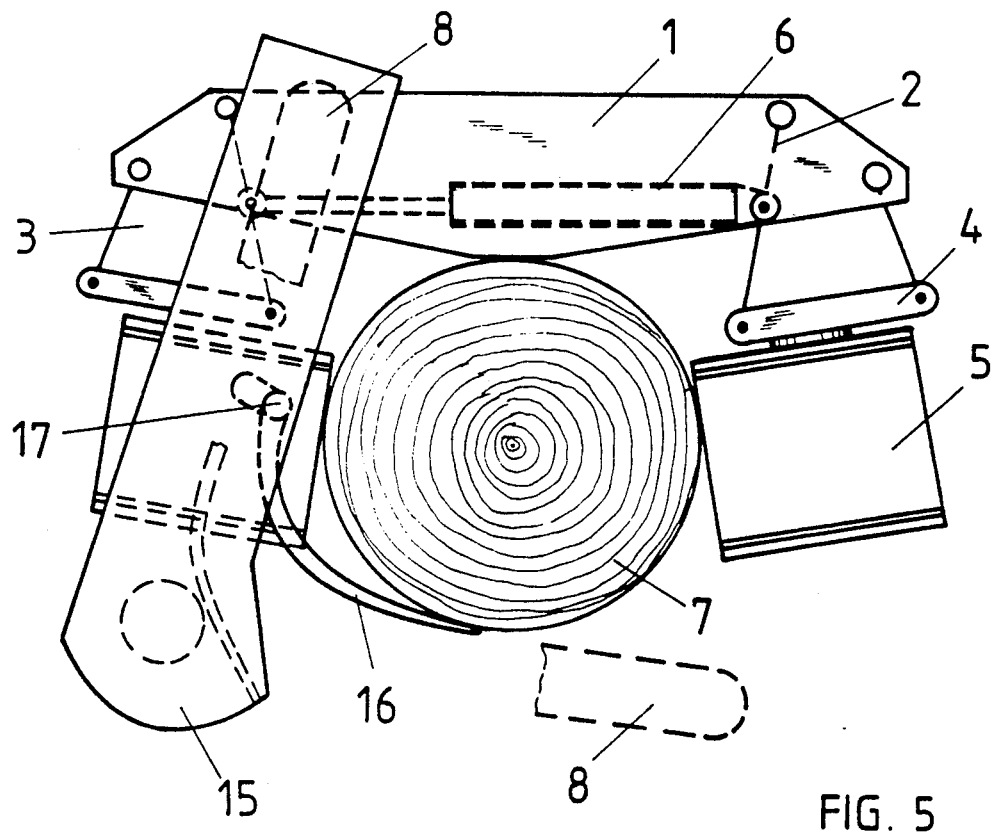
FIG. 5 illustrates the timber harvester in the manner of FIG. 1 handling an over-sized tree.

In FIG. 5, the rear blade 16 is shown handling an over-sized tree 7. Here, the stripping is no longer perfect, the rear blade 16 can only carry the tree 7, but it can be seen how, even in its resting position, (rear blade 16 as a broken line) rear blade 16 does not interfere with tree 7 being gripped or released. During the possible loss of grip of the feed tracks 5, blade 16 is protected inside the case 15 of saw 8.

FIGS. 2, 4 and 5 show how saw motor 9 limits the resting position of rear blade 16, that is, that rear blade 7 is only able to move away from the tree 7 to the position limited by motor 9. FIG. 2 shows how much space longitudinally is required in the direction of the tree, a rear blade 16 is located in front of motor 9, that is, between motor 9 and stripping blades 20. By means of trapezoid arms 2 and 3 an advantageous track is created for case 15 in relation to tree 7, by means of which a short rear stripping blade 16 is achieved. It is also possible to improve the space for blade 16 limited by motor 9, and still blade 16 does not, due to the form of its resting position, protrude from saw case 15 seen in the direction of the tree feed. It should be particularly noted, that the greatest curve of the rear blade is located close to the joint point 17, whereas the point of blade 16 is relatively straight. This greatly eases the positioning of the rear blade 16 in the case 15. This kind of form would not be possible, if the blade was jointed directly to the frame 1 of the harvester.

Stripping blade 16 is most advantageously plate-shaped, and both sides of it can be bevelled to achieve stripping. Further, the creation of a suitable path of movement for feed track 5 demands that arm 2 is longer than arm 3. It will be noticed from FIG. 4 that on account of the space demanded by the rest position of rear stripping blade 16, it is advantageous that when the harvester grips trees, the feed tracks form a downward opening angle.

Furthermore, the location of the motor 9 of the saw 8 in such a way that part of its is inside the case 15, when viewed from the direction of the axle of motor 9, makes it possible to form such a case structure around motor 9 that joins the partial intermediate wall 21 to the edge of the Case 15 on the side of feed track frame 4. The motor 9 is located beneath feed track 5.

It is advantageous to attach the rear stripping blade 16 to the joint point 17, between the upper and lower edges. If the joint point 17 is above the feed track 5, the connection of the feed track frame 4 and the case 15 becomes difficult. The joint point 17 is slightly, about 10 cm, farther out from the point of contact of the feed track 5 and the tree 7, when seen from the feed direction (FIGS. 2, 4 and 5).

The rear stripping blade 16 can also be attached directly to the frame structure of the feed track 5. But, as can be seen from FIG. 4, saw 8 is also inside case 15, so that both the rear stripping blade 16 and the saw 8 need space inside case 15, at least where the feed track 5 is. It is thus advantageous that external forces are handled through the outer surfaces of the case 15 and through the case built around motor 9. In this way, a strong construction is created.

While the best mode for carrying out the invention has been described in detail, those familiar with the art to which this invention relates will recognize various alternative designs and embodiments for practicing the invention as defined by the following claims.

What is claimed is:

1. A timber harvester which consists of a frame, a feeding device, a front stripping blade, a rear stripping blade and in which the feeding device is carried on joined trapezoidal arms and the rear stripping blade is attached to the feeding device essentially in line with the compressive force between the feeding device and a tree, when seen from the direction of the tree feed, characterized in that a saw case is attached to the feeding device and the rear stripping blade and a cylinder for moving the rear stripping blade are mounted in the saw case.

2. A timber harvester in accordance with claim 1 characterized in that the rear stripping blade is pivotable about a joint point, and the joint point is located behind the feeding device and 5–15 cm outward from a point of contact of the feeding device and the tree, when seen from the feed direction.

3. A timber harvester in accordance with claims 1 or 2 characterized in that the rear blade is given a curved form along its length, in such a way that the greatest curve is located close to the joint point, and its curvature decreases along its length from the joint point.

* * * * *